United States Patent

Matsushita et al.

[15] 3,647,531
[45] Mar. 7, 1972

[54] METHOD OF APPLYING COATING OF METAL OXIDES UPON SUBSTRATES

[72] Inventors: Toru Matsushita, Yokohama-shi; Kunimoto Suzuki, Tokyo; Shoji Hasegawa, Yokohama-shi, all of Japan

[73] Assignee: Tokyo Shibaura Electric Co., Ltd., Kawasaki-shi, Japan

[22] Filed: Apr. 8, 1968

[21] Appl. No.: 719,702

[30] Foreign Application Priority Data

Apr. 11, 1967 Japan..................................42/22597
Oct. 13, 1967 Japan..................................42/65390

[52] U.S. Cl.............................117/211, 117/229, 117/124 T
[51] Int. Cl..........................................................C03c 17/22
[58] Field of Search.............117/201, 211, 221, 229, 124 A, 117/107.2, 124 T; 252/518, 520

[56] References Cited

UNITED STATES PATENTS

| | | |
|---|---|---|
| 2,617,742 | 11/1952 | Olson......................................117/211 |
| 2,805,965 | 9/1957 | Robinson................................117/221 |
| 3,019,136 | 1/1962 | Auffenorde et al....................117/211 |
| 3,108,019 | 10/1963 | Davis....................................117/211 X |
| 2,768,909 | 10/1956 | Haslam..................................117/124 A |
| 3,005,731 | 10/1961 | Payne....................................117/124 A |
| 3,066,048 | 11/1962 | Mitchell................................117/221 |

*Primary Examiner*—Ralph S. Kendall
*Assistant Examiner*—J. H. Newsome
*Attorney*—Stephen H. Frishauf

[57] ABSTRACT

A composition consisting of an organic stannous compound wherein organic radicals and divalent tin are bonded together by the aid of oxygen such as a stannous alkoxide $Sn(OR)_2$ or stannous acyl compound $Sn(OOCR)_2$ and an organic material compound wherein organic radicals and titanium or antimony atom are bonded together by the aid of oxygen such as antimonous alkoxide $Sb(OR)_3$, antimonous acyl compound $Sb(OOCR)_3$, titanium (IV) alkoxide $Ti(OR)_4$ or titanium (IV) acyl compound $Ti(OOCR)_4$ is applied upon the surface of a substrate and the applied composition is pyrolyzed to form a coating of electroconductive metal oxide on the substrate.

4 Claims, No Drawings

METHOD OF APPLYING COATING OF METAL OXIDES UPON SUBSTRATES

This invention relates to a method of applying a coating of homogeneous, transparent and tough electroconductive tin oxide upon a substrate.

While there have been proposed a number of methods of applying a coating of electroconductive metal oxides upon a substrate they can be generally classified into the following four types.

I. The spray method

This method comprises a step of spraying a mixed aqueous solution of $SnCl_4$ and $SbCl_3$ upon a heated surface of a substrate to cause it to pyrolyze to form a coating of electroconductive tin oxide consisting of a solid solution in which $Sb_2O_3$ is contained in $SnO_2$, and this method is most commonly used. However, this method is not advantageous in that pyrolysis gives rise to the evolution of HCl vapor which is not only harmful to the operator but also is very likely to corrode metallic apparatus, thus making it necessary to provide sufficient ventilation to avoid such occurences. Further, according to this method, it is difficult to apply the coating upon a selected portion of the substrate so that in order to apply the coating upon a particular portion of the substrate, it is required to first form the coating over the entire surface thereof and then remove the coating at portions not required to be coated by means of a grinder.

II. The evaporation method

This method comprises the step of simultaneously heating and evaporating a volatile organic tin compound, for example, trimethyl tin chloride, trimethyl tin hydroxide, tripropyl tin chloride, bis-tributyl tin oxide, dibutyl tin dilaurate, triphenyl tin chloride, dimethyl tin dichloride, and an organic antimony compound to pyrolyze them on a substrate heated to a high temperature whereby to form a coating of electroconductive tin oxide consisting of a solid solution wherein $Sb_2O_3$ is contained in $SnO_2$. This method is also defective in that organic tin compounds are highly poisonous and that like the spray method it is difficult to form the coating upon the selected portion alone of the substrate.

III. The hot dipping method

This method comprises the steps of rapidly immersing a substrate heated to a high temperature in a mixed solution of a tin compound and an antimony compound, for example, an alcohol solution of stannic chloride $SnCl_4$ and antimonous chloride $SbCl_3$ or in a mixed molten liquid of a tin compound and an antimony compound, for example, a mixed molten liquid of stannic chloride and antimonous chloride to cause them to pyrolyze on the surface of the substrate thus forming a coating of $SnO_2$ consisting of a solid solution wherein $Sb_2O_3$ is contained in $SnO_2$. This method is also disadvantageous in that it is necessary to use substrates of high heat shock strength, that it is not possible to adjust the thickness of the coating to any desired value and that it is not possible to form the coating only upon the selected portion of the substrate.

IV. The cold dipping method

This method is commonly known as the dipping method and comprises the steps of applying a mixture of a tin compound and an antimony compound upon the surface of a substrate by brushing, dipping, spraying and the like method and then heating to pyrolyze said compounds to form a $SnO_2$ coating consisting of a solid solution in which $Sb_2O_3$ is contained in $SnO_2$. This method is advantageous in that it is possible to form a uniform coating upon a substrate of complicated configuration, and that selected portion or portions can be coated as by masking said portions by printing or brushing a substance which vaporizes upon pyrolysis. However, this method has not been commercially used because tin and antimony compounds suitable for this process are not yet available.

This invention provides a method of applying a coating of homogeneous, transparent and tough electroconductive metal oxides upon a substrate, comprising the steps of applying upon the surface of a substrate a composition consisting of an organic stannous compound wherein organic radicals and divalent tin atoms are bonded together by the aid of oxygen, such as stannous alkoxide $Sn(OR)_2$ or stannous acyl compound $Sn(OOCR)_2$, where R represents an alkyl radical, and an organic metal compound wherein organic radicals and trivalent antimony atoms or tetravalent titanium atoms are bonded together by the aid of oxygen such as antimonous alkoxide $Sb(OR)_3$, antimonous acyl compound $Sb(OOCR)_3$, titanium (IV) alkoxide $Ti(OR)_4$ or titanium (IV) acyl compound $Ti(OOCR)_4$, where R represents an alkyl radical, and pyrolyzing the applied composition to form said coating of metal oxide. According to this invention the resistance value of the coating varies dependent upon the organic antimony compound or organic titanium compound incorporated with the organic stannous compound. More particularly, where an organic antimony compound is incorporated, it is possible to obtain a coating of metal oxides having a low surface resistivity suitable for use as a highly conductive coating or a low-resistance coating whereas incorporation of an organic titanium compound results in a coating of metal oxides having a high surface resistivity suitable for use as a low-conductivity coating or a high-resistance coating.

The electroconductive coating of metal oxides prepared according to the method of this invention may be used for various applications as a transparent, tough and electroconductive coating. Especially when used as a prime coating for a chemical plating, it is possible to greatly improve the stripping strength of the plated layer. Further when the composition of this invention is applied only to required portions on the substrate, dried and fired, transparent and elec,roconductive coatings may be formed only at desired portions.

A compound of the $Sn(OR)_2$ series or $Sn(OOCR)_2$ series and a compound selected from the group consisting of $Sb(OR)_3$, $Sb(OOCR)_3$, $Ti(OR)_4$ and $Ti(OOCR)_4$ are simultaneously ;issolved in an organic solvent, the resulted solution is applied upon a substrate, and the coated substrate is dried at a temperature ranging from about 100° to 250° C., and then fired at a temperature more than 400° C. whereby a coating consisting of a solid solution wherein $Sb_2O_3$ or $TiO_2$ is contained in $SnO_2$ is formed on the surface of the substrate. As $Sn(OR)_2$ may be utilized stannous octyloxide, stannous decyloxide or stannous hexyloxide, while as $Sn(OOCR)_2$ stannous valerate or stannous caproate may be used. As $Sb(OR)_3$ may be used antimonous tributoxide, ethoxy dihexyloxy stibine or trihexyloxy stibine may be used while as $Sb(OOCR)_3$ may be used antimonous butyrate or diethoxystibine acetate. Further, among $Ti(OR)_4$ are included titanium tetrabutoxide, dibutoxy dipropoxy titanium and titanium tetra pentyloxide and among $Ti(OOCR)_4$ are included titanium stearate and a polymer of butoxy titanium stearate.

The solvent for dissolving said organic compounds may be any one of suitable organic solvents, for example, alcohols, ethers, organic esters and organic hydrocarbons. However, lower alcohols such as methanol, ethanol, etc., which contain a great deal of water, are not suitable because they tend to hydrolyze said organic compounds thus causing the solution to become cloudy, such solution being not suitable to store over a long period of time. When the mixed solution of said respective organic compounds is applied to the surface of the substrate and then dried, a clear transparent coating is formed which exhibits interference color. At this stage, however, a coating of $SnO_2$ containing $Sb_2O_3$ or $TiO_2$ is not yet completed, organic components still remaining in large quantities. Upon heating to a temperature ranging from 300° to 400° C. all of the remaining components undergo pyrolysis and volatilize in the form of water, carbon dioxide and the like, thus leaving a coating of oxide upon the surface of the substrate. At this stage, however, the strength of the coating is not sufficiently high. Accordingly, the coating is further heated to a temperature ranging from 400° to 500° C. or more to increase the strength thereof. Although dependent upon the material of the substrate and the composition of solution, the surface resistivity is about 5 kiloohms per square when employing $Sb_2O_3$ whereas about 1 megohm per square to $10^6$ megohm per square for $TiO_2$.

Although the mechanism of forming a strong and homogeneous coating of metal oxides in this manner is not yet clearly understood it is supposed that concurrently with oxidation of $Sn(OR)_2$ and $Sn(OOCR)_2$ into $SnO(OR)_2$ and $SnO(OOCR)_2$ during the drying step at 100° to 250° C., the compounds are gradually hydrolized by the moisture in air to form Sn—O—Sn bonds. Simultaneously therewith a coexisting antimony compound or titanium compound also undergoes hydrolysis to form Sb—O—Sb or Ti—O—Ti bonds, which combine with said Sn—O—Sn bond to form a coating manifesting interference color. Under this condition organic components formed as the result of hydrolysis are supposed to coexist in the grid of the oxides, and when such an oxide is heated to a temperature ranging from 300° to 400° C., all organic compounds will pyrolyze to leave only the oxide layer. Even at this stage, the mechanical strength of the layer is not sufficient because crystallization of the oxide is not yet completed. At temperatures of 400° to 500° C. or more crystallization proceeds completely, thus providing an electroconductive coating of increased mechanical strength and stability.

According to the method either a low-resistance or high-resistance coating may be provided by incorporating an organic antimony compound or an organic titanium compound to an organic stannous compound and by varying the ratio of incorporation of two compounds the resistance value of the low-resistance or high-resistance coating can be adjusted. More particularly, when incorporating an antimonous compound, where the percentage of antimony oxide in terms of the sum of tin oxide and antimony oxide formed by pyrolysis in less than 1 percent, the resistance of the coating is not so low, but decreases rapidly as the percentage exceeds 1 percent, the rate of decrease in resistance value being the maximum in a range of from 1 to 25 percent while decreasing again beyond 30 percent. Where an organic titanium compound is incorporated when the percentage of titanium oxide in terms of the sum of tin oxide and titanium oxide which are formed by pyrolysis is less than 0.1 percent the resistance value is not so high but increases abruptly beyond 3 percent, the rate of increase in resistance value being the maximum in a range of from 3 to 80 percent, while decreasing again beyond 80 percent.

When other organic tin compounds than those utilized in this invention, such for example, as dibutyl tin diacetate $(C_4H_9)Sn(CH_3COO)_2$, dibutyl tin dilaurate $(C_4H_9)_2 Sn(C_{11}H_{23}COO)_2$, dibutyl tin octyl maleate $(C_4H_9)_2Sn$ $(C_8H_{17}OOCCHCHCOO)_2$, dimethyl tin dichloride $(CH_3)_2SnCl_2$ or dibutyl tin maleate $(C_4H_9)_2SnC_4H_2O_4$ are dissolved in an organic solvent such as alcohols and ethers, applied onto a substrate, dried and fired at a temperature above 500° C., it is not possible to obtain transparent coatings, tetrabutyl tin $(C_4H_9)_4Sn$ and tributyl tin chloride $(C_4H_9)_3SnCl$ evaporate when heated to 500° C. thus leaving little tin oxide $SnO_2$. Further dibutyl tin oxide $(C_4H_9)_2SnO$ and dioctyl tin oxide $(C_8H_{17})_2SnO$ are difficult to dissolve in either an inorganic or organic solvent so that they can not be applied on the surface of the substrate. Further when solutions of inorganic tin compounds are applied upon the substrate followed by heating $SnO_2$ may remain on the surface thereof but they can not form a coating.

When other antimony compounds such as diphenyl p-methoxy phenylstibine $(C_6H_5)_2SbC_6H_4OCH_3$, diphenyl o-tolylstibine $(C_6H_5)_2SbC_6H_4CH_3$, diethoxy iodostibine $(C_2H_5O)_2SbI$, trivinyl stibine $(C_2H_3)_3Sb$ or tribenzyl stibine $(C_6H_5CH_2)_3Sb$ is incorporated into a solution consisting of an organic solvent containing a stannous alkoxide or a stannous acyl compound and when the resultant solution is applied on a substrate, and the coated substrate is dried and fired, the coating becomes cloudy or coatings of high electroconductivity can not be obtained. Incorporation of triphenyl antimony $Sb(C_6H_5)BQ3$, triphenyl antimony dichloride $(C_6H_5)_3SbCl_2$, or tritolyl stibine $Sb(C_6H_4CH_3)_3$ slightly increases the conductivity but results in such undesirable effects as to evaporate poisonous organic antimony compounds when subjected to heat and to increase the surface tension of the solution which makes it difficult to spread the solution when it is applied onto the substrate. In addition an inorganic antimony compound is difficult to be dissolved in organic solvents, and if dissolved causes clouding of the formed coating.

Further, other titanium compounds such as dimethyl dicyclopentadienyl titanium $(C_5H_5)_2Ti(CH_3)_2$, dicyclopentadienyl dichlorotitanium $(C_5H_5)_2TiCl_2$ and diphenyl dicyclopentadienyl titanium $(C_6H_5)_2Ti(C_5H_5)_2$ are not suitable for this invention because they form cloudy and nonuniform coatings when they are incorporated into a solution consisting of an organic solvent and an organic stannous compound dissolved therein, and the resulted solution is applied on a substrate, dried and then fired. In addition, such coatings have substantially no conductivity and hence are electric insulators. Further, inorganic titanium compounds are difficult to dissolve in organic solvents and even when dissolved the resultant coatings are cloudy.

EXAMPLE 1

Thirteen g. of stannous octyloxide $Sn(OC_8H_{17})_2$ and 2 g. of antimonous tributoxide $Sb(OC_4H_9)_3$ were dissolved in 85 g. of butanol $C_4H_9OH$. A substrate of soda-lime glass 20×30 mm. in size was dipped in the resultant solution, taken out and dried at a temperature of 150° C. for 10 minutes. The substrate was then heated for about 3 minutes to an extent not to cause it to deform by an oxidizing flame of a bunsen gas burner. As a result a transparent coating exhibiting interference color and having a surface resistivity of 8 kilohms per square was formed on the substrate. On the other hand, the coating not incorporated with $Sb(OC_4H_9)_3$ has a surface resistivity of 200 kilohms per square.

EXAMPLE 2

Four g. of stannous decyloxide $Sn(OC_{10}H_{21})_2$, 4 g. of stannous octyloxide $Sn(OC_8H_{17})_2$, 3 g. of stannous valerate $Sn(OOCC_4H_9)_2$ and 0.8 g. of diethoxystibine acetate $(C_2H_5O)_2Sb(OOCCH_3)$ were dissolved in 88.2 g. of isopropyl alcohol $C_3H_7OH$. The solution was applied only once by a brush upon a surface of a quartz substrate of the dimensions of 20×30 mm., and the coated substrate was dried at a temperature of 150° C. for 20 minutes and then heated in an electric furnace at a temperature of 500° C. for 30 minutes. A transparent coating having a surface resistivity of 10 kilohms per square and manifesting interference color was obtained on the surface of the quartz substrate.

Where $(C_2H_5O)_2Sb(OOCCH_3)$ was not incorporated the coating showed a surface resistivity of 100 kilohms per square.

EXAMPLE 3

Ten g. of stannous hexyloxide $Sn(OC_6H_{13})_2$ and 1.7 g. of ethoxy dihexyloxy stibine $(C_2H_5O)Sb(C_6H_{13}O)_2$ were dissolved in 88.3 g. of butyl acetate $CH_3COOC_4H_9$. The solution was sprayed on the entire peripheral surface of a round rod of alumina ceramic, 7 mm. dia., and 30 mm. long, and the coated rod was dried for 10 minutes at a temperature of 120° C., and then heated in an electric furnace maintained at a temperature of 600° C. for 30 minutes. After cooling, a transparent coating was formed on the surface of the round rod, having a surface resistivity of 5 kilohms per square.

Where $(C_2H_5O)Sb(C_6H_{13}O)_2$ was not incorporated the coating showed a surface resistivity of 80 kilohms per square.

EXAMPLE 4

Thirteen g. of stannous octyloxide $Sn(OC_8H_{17})_2$ and 0.7 g. of antimonous butyrate $Sb(OOCC_3H_7)_3$ were dissolved in 86.3 g. of kerosene. A round rod of porous mullite ceramic, 5 mm. dia., and 30 mm. long was dipped in this solution. After removing from the solution the rod was dried at a temperature of 200° C. for 20 minutes and then heated at a temperature of 700° C. for 30 minutes. After cooled to room temperature above-described cycle of immersion, drying and heating was repeated. Then silver paste was applied to the opposite ends of the rod over a length of 5 mm. respectively, to form electrodes. The resistance of the portion having a length of 20 mm. between electrodes was measured to be 3 kilohms.

Where $Sb(OOCC_3H_7)_3$ was not incorporated the resistance between opposite ends was 30 kilohms.

EXAMPLE 5

Twenty-nine g. of stannous caproate $Sn(OOCC_5H_{11})_2$ and 2 g. of trihexyloxy stibine $Sb(OC_6H_{13})_3$ were dissolved in 58 g. of hexyl alcohol $C_6H_{13}OH$. To this solution was mixed a solution consisting of 30 g. of amyl acetate $CH_3COOC_5H_{11}$ and 1 g. of cellulose acetate dissolved therein. The mixed solution was applied only once by means of a brush upon the surface of a borosilicate glass substrate of the dimensions of 20×30 mm., and the coated substrate was dried at a temperature of 150° C. for 15 minutes and finally heated to a temperature of 650° C. for 30 minutes and there was obtained a transparent coating having a surface resistivity of 7 kilohms per square.

The coating not incorporated with $Sb(OC_6H_{13})_3$ showed a surface resistivity of 100 kilohms per square.

EXAMPLE 6

Thirteen g. of stannous octyloxide $Sn(OC_8H_{17})_2$ and 13 g. titanium tetrabutoxide $Ti(OC_4H_9)_4$ were dissolved in 74 g. of buthanol $C_4H_9OH$ and a soda-lime glass substrate of the dimension of 20×30 mm. was dipped in this solution. After removal, the substrate was dried at a temperature of 150° C. for 10 minutes, heated for 3 minutes to an extent not to cause it to deform by an oxidizing flame of a Bunsen gas burner and then cooled. On the substrate was formed a transparent coating manifesting interference color and having a surface resistivity of $10^4$ megohms per square. In contrast, the coating not incorporated with $Ti(OC_4H_9)_4$ showed a surface resistivity of 200 kilohms per square.

EXAMPLE 7

Four g. of stannous decyloxide $Sn(OC_{10}H_{21})_2$, 4 g. of stannous octyloxide $Sn(OC_8H_{17})_2$, 3 g. of stannous valerate $Sn(OOCC_4H_9)_2$ and 0.8 g. of a polymer of butoxytitanium stearate were dissolved in 88.2 g. of isopropyl alcohol $C_3H_7OH$. The solution was applied only once upon the surface of a quartz substrate of the dimension of 20×30 mm. by means of a brush. The coated substrate was then dried at a temperature of 150° C. for 20 minutes and heated in an electric furnace at a temperature of 500° C. for 30 minutes. On the surface of the quartz substrate was formed a transparent coating manifesting interference color and having a surface resistivity of 40 megohms per square.

In the absence of said polymer of titanium compound the surface resistivity was lower than 100 kilohms per square.

EXAMPLE 8

Ten g. of stannous hexyloxide $Sn(OC_6H_{13})_2$, and 20 g. of dibutoxy dipropoxy titanium $(C_4H_9O)_2Ti(C_3H_7O)_2$ were dissolved in 70 g. of butyl acetate $CH_3COOC_4H_9$. The solution thus prepared was sprayed on the entire peripheral surface of a round rod of alumina ceramic, having a diameter of 7 mm. and a length of 30 mm. and the rod was then dried at a temperature of 120° C. for 10 minutes and heated in an electric f$rnace maintained at 600° C. for 30 minutes. After cooling, a transparent coating was formed on the rod having a surface resistivity of $10^5$ megohms per square.

The coating not incorporated with $(C_4H_9O)_2Ti(C_3H_7O)_2$ showed a surface resistivity of 80 kilohms per square.

EXAMPLE 9

Thirteen g. of stannous octyloxide $Sn(OC_8H_{17})_2$, and 0.7 g. of titanium sterate $Ti(OOC_{17}H_{35})_4$ were dissolved in 86.3 g. of kerosene. A round rod of porous mullite ceramic, 5 mm. dia., and 30 mm. long was immersed in this solution, taken out of the solution, dried at a temperature of 200° C. for 20 minutes and finally heated at a temperature of 700° C. for 30 minutes. After the rod has been cooled to room temperature, above cycle of immersion, drying and heating was repeated under the same condition. Thereafter, silver paste was applied on the opposite ends of the round rod over a length of 5 mm., respectively, to form electrodes. The resistance at the portion (which has a length of 20 mm.) between electrodes was measured to be 3 megohms.

In contrast, in the absence of $Ti(OOCC_{17}H_{35})_4$ the resistance between opposite ends was 30 kilohms.

EXAMPLE 10

Nine g. of stannous caproate $Sn(OOCC_5H_{11})_2$ and 2 g. of titanium tetrapentyloxide $Ti(OC_5H_{11})_4$ were dissolved in 58 g. of hexyl alcohol $C_6H_{13}OH$ and the solution thus prepared was mixed with a solution consisting of 30 g. of amyl acetate $CH_3COOC_5H_{11}$ containing 1 g. of cellulose acetate dissolved therein. The mixed solution was applied only once upon a substrate of borosilicate glass substrate of the dimensions of 20×30 mm. with a brush and the coated substrate was dried at a temperature of 150° C. for 15 minutes and then heated to a temperature of 650° C. for 30 minutes to form a transparent coating having a surface resistivity of 100 megohms per square.

In contrast, in the absence of $Ti(OC_5H_{11})_4$, the surface resistivity of the coating was 100 kilohms per square.

While the invention has been described in connection with some preferred embodiments thereof, the invention is not limited thereto and includes any modifications and alternations which fall within the scope of the invention as defined in the appended claims.

What we claim is:

1. A method of applying a transparent coating of metal oxides upon a substrate comprising the steps of applying a composition upon the surface of said substrate, said composition comprising a solution in an organic solvent of an organic stannous compound selected from the group consisting of stannous alkoxide represented by $Sn(OR)_2$ and stannous acyl compound represented by $Sn(OOCR)_2$, where R in said general formulas represents an alkyl group, said organic stannous compound including a linkage wherein organic radicals are bonded to a divalent tin atom by the aid of oxygen, and an organic metal compound selected from the group consisting of antimonous alkoxide represented by $Sb(OR)_3$, antimonous acyl compound represented by $Sb(OOCR)_3$, titanium (IV) alkoxide represented by $Ti(OR)_4$ and titanium (IV) acyl compound represented by $Ti(OOCR)_4$, where R in said general formulas represents an alkyl radical, said organic metal compound containing a linkage wherein a metal atom is bonded to organic radicals by the aid of oxygen, drying the resulting coating of said organic composition on said substrate at a temperature of from about 100° to about 250° C., and then heating the resulting dried coating at a temperature of from about 300° to about 700° C. to pyrolyze said composition, whereby a coating of metal oxides is formed upon the surface of said substrate.

2. A method according to claim 1, wherein said stannous alkoxide is selected from the group consisting of stannous octyloxide, stannous decyloxide, and stannous hexyloxide, and said stannous acyl compound is selected from the group consisting of stannous valerate and stannous caproate.

3. A method according to claim 1, wherein said antimonous alkoxide is selected from the group consisting of antimonous tributoxide, ethoxy dihexyloxy stibine, and trihexyloxy stibine, and said antimonous acyl compound is selected from the group consisting of antimonous butylate and diethoxy stibine acetate.

4. A method according to claim 1, wherein said titanium (IV) alkoxide is selected from the group consisting of titanium tetrabutoxide, dibutoxy dipropoxy titanium and titanium tetrapentyloxide and said titanium (IV) acyl compound is titanium stearate.

UNITED STATES PATENT OFFICE
CERTIFICATE OF CORRECTION

Patent No. 3,647,531   Dated March 7, 1972

Inventor(s) TORU MATSUSHITA et al

It is certified that error appears in the above-identified patent and that said Letters Patent are hereby corrected as shown below:

Column 3, line 71 - "$Sb(C_6H_5BQ3$" should be "$Sb(C_6H_5B)_3$"

Column 3, line 48 - "in" should be "tin"

Signed and sealed this 24th day of April 1973.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,647,531　　　　　　　　Dated March 7, 1972

Inventor(s) Toru Matsushita et al.

It is certified that error appears in the above-identified patent and that said Letters Patent are hereby corrected as shown below:

Column 5, line 42, "$Sn(OOCC_4Hg)_2$" should read -- $Sn(OOCC_4H_9)_2$ --.

Signed and sealed this 20th day of August 1974.

(SEAL)
Attest:

McCOY M. GIBSON, JR.　　　　　　　C. MARSHALL DANN
Attesting Officer　　　　　　　　　Commissioner of Patents

UNITED STATES PATENT OFFICE
CERTIFICATE OF CORRECTION

Patent No. 3,647,531              Dated March 7, 1972

Inventor(s) Toru Matsushita et al.

It is certified that error appears in the above-identified patent and that said Letters Patent are hereby corrected as shown below:

Column 3, line 71, "$Sb(C_6H_5BQ3$" should read -- $Sb(C_6H_5)_3$ --.

Column 3, line 48, "in" should read -- tin --.

This Certificate supersedes Certificate of Correction issued April 24, 1973.

Signed and Sealed this

Fourth Day of October 1977

[SEAL]

Attest:

RUTH C. MASON
*Attesting Officer*

LUTRELLE F. PARKER
*Acting Commissioner of Patents and Trademarks*